United States Patent

Bakeman et al.

[15] 3,675,153
[45] July 4, 1972

[54] LASER OSCILLATOR CONSTRUCTION

[72] Inventors: Orville B. Bakeman, Syracuse; Allen D. French, Manlius, both of N.Y.

[73] Assignee: General Electric Company

[22] Filed: Sept. 1, 1970

[21] Appl. No.: 68,606

[52] U.S. Cl. .........................................................331/94.5
[51] Int. Cl. ...............................................................H01s 3/00
[58] Field of Search................................................331/94.5

[56] References Cited

UNITED STATES PATENTS

| | | | |
|---|---|---|---|
| 3,440,562 | 4/1969 | Koester.................................. | 331/94.5 |
| 3,445,785 | 5/1969 | Koester et al.......................... | 331/94.5 |
| 3,578,849 | 5/1971 | Guillet................................... | 331/94.5 X |
| 3,430,158 | 2/1969 | Fox et al................................ | 331/94.5 |
| 3,179,899 | 4/1965 | Fox........................................ | 331/94.5 |
| 3,388,343 | 6/1968 | White..................................... | 331/94.5 |
| 3,478,277 | 11/1969 | Gordmaine............................ | 331/94.5 |

OTHER PUBLICATIONS

Siegman: " Unstable Optical Resonators for Laser Applications," Proc. IEEE, March, 1965, pp. 277– 287

*Primary Examiner*—Ronald L. Wibert
*Assistant Examiner*—Edward S. Bauer
*Attorney*—Carl W. Baker, Richard V. Lang, Frank L. Neuhauser, Oscar B. Waddell and Joseph B. Forman

[57] ABSTRACT

A laser oscillator (Fabry-Perot) cavity configuration supporting only the primary oscillation with no inner loop parallel planes capable of supporting secondary oscillations which cause hot spots in the laser beam. Such configuration is accomplished by angling the output end surface of the laser rod, or both end surfaces of the rod in severe cases, slightly off the perpendicular to the rod axis.

4 Claims, 3 Drawing Figures

INVENTORS:
ALLEN D. FRENCH,
ORVILLE R. BAKEMAN,

BY  C. W. Baker
THEIR ATTORNEY.

3,675,153

LASER OSCILLATOR CONSTRUCTION

BACKGROUND OF THE INVENTION

This invention relates to laser oscillators and more specifically to laser oscillator optical configurations enabling operation at high power levels without injury to elements of the laser or associated optical system.

In many laser applications, and particularly in industrial applications such as laser welding, laser machining and the like, there exists a need to maximize power output of the laser system. When operated to achieve these desired high power levels, laser oscillators as conventionally constructed sometimes suffer pitting of optical surfaces, particularly the end surfaces of the laser rod and the reflecting or partially reflecting surfaces of the etalons defining the oscillator cavity. Also, even in cases in which the energy levels do not reach a point where pitting occurs, the laser beam may be nonuniform in energy distribution and have "hot spots" at one or more points within the beam. Such localized high energy levels may cause damage to elements of the laser optics or of the associated optical system, and they often are incompatible with requirements of the user apparatus.

The present invention has as its principal objective the provision of laser oscillator optical configurations affording improved power capability through improved uniformity of energy distribution in the laser beam and elimination of hot spots therefrom. In its simplest and presently preferred embodiment, the invention accomplishes these improvements by elimination of multiple parallel flat surfaces within the laser optical system, this in turn being accomplished by slightly beveling or angling one or both of the laser rod output ends and adjusting the associated optical system as necessary to maintain the primary Fabry-Perot cavity so as to support laser oscillation.

Thus the optical configuration of the present invention substitutes for the conventional laser oscillator configuration, in which the laser rod ends are polished flat and parallel to each other to close tolerances, a configuration in which at least one of the laser rod end surfaces is disposed at a small angle to the perpendicular to the rod axis. Laser systems in which the laser rods have their ends angled with respect to each other are of course known in the prior art, but in these known systems the rod ends are beveled generally to the Brewster angle - a relatively large angle - and this is done specifically for a different purpose.

SUMMARY OF THE INVENTION

In accordance with the invention, the problem of uneven distribution of energy in the beam of a laser oscillator, and the resultant problems of hot spot damage to elements of the laser and associated optical system, are alleviated by elimination of optical feedback paths within the laser cavity, the preferred method for accomplishment of this being to tilt one or both of the rod end surfaces to a small angle with respect to the perpendicular to the rod axis. The primary Fabry-Perot cavity still is maintained by alignment of the mirror and output elements to support laser oscillation, but secondary oscillations between pairs of parallel optical surfaces within the laser cavity are reduced or eliminated. To minimize alignment problems only one rod end surface, preferably that at the output end, need be thus angled, and the output element selected is a wedge which may conveniently be of essentially this same angle and be disposed with its front surface parallel to the rod output end surface, so the output beam again is parallel to the rod axis. For extreme cases of hot spots the output element wedge can be rotated with respect to the adjacent rod end surface, and both end surfaces of the laser rod may be angled with respect to the perpendicular to the rod axis as well as with respect to each other. The angle through which the rod end surfaces are displaced from the perpendicular to the rod axis typically is between one-quarter degree and 2° the preferred angle being approximately one-half degree.

DESCRIPTION OF THE PREFERRED EMBODIMENTS

Figure 1:
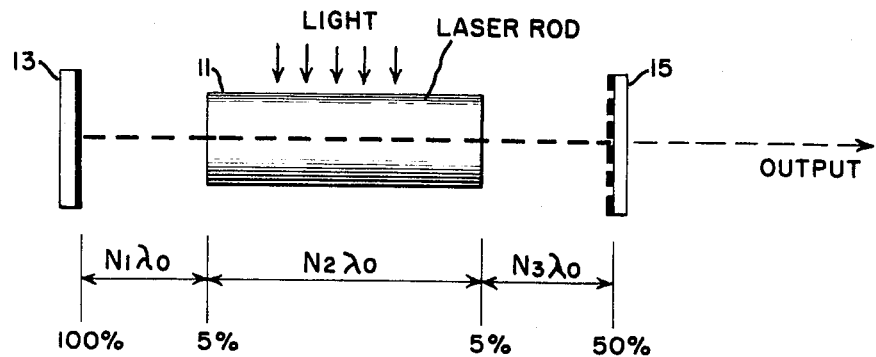
FIG. 1 illustrates schematically a conventional laser optical configuration in elemental form.

In the conventional laser oscillator optical configuration shown diagrammatically in FIG. 1, the laser rod 11 of negative temperature material is positioned between two etalons 13 and 15, one of which is substantially totally reflective (100 percent as indicated) and the other of which is only partially reflective (50 percent as indicated) and serves as the output. The output element often is an optical wedge and in such cases the wedge normally is so placed that its partially reflective surface is parallel to the rod end face when aligned for laser beam output. Etalons 13 and 15 define with the laser rod 11 the primary Fabry-Perot cavity, and in operation this cavity maintains a primary laser oscillation in which the laser beam transits back and forth between the two etalons, being reinforced upon each such transit by lasing action within the rod 11, and exits through the partially transparent output etalon 15 as shown by the arrow.

In practice the opposite ends of the laser rod 11, even though carefully ground and polished, will have a finite reflectance which typically is about 5 percent as indicated in FIG. 1. Therefore, each of the laser rod end surfaces defines with the reflective surface of the adjacent etalon a secondary cavity in which secondary oscillation may occur. Secondary oscillation also can occur within the laser rod itself, between the opposed end surfaces of the rod, and here the effect may be regenerative due to lasing action within the rod. As indicated in FIG. 1, such secondary oscillations are strongest if spacing between the reflective surfaces which define the secondary cavities is equal to the product of the laser wavelength $\lambda_0$ and an integer $N_1$, $N_2$ or $N_3$. Energy levels within these secondary oscillation cavities then may become sufficiently high to substantially degrade the uniformity of energy distribution through the laser beam and to cause hot spots with consequent injury to optical elements, particularly the reflective surface of the output etalon which often is relatively fragile.

Figure 2:
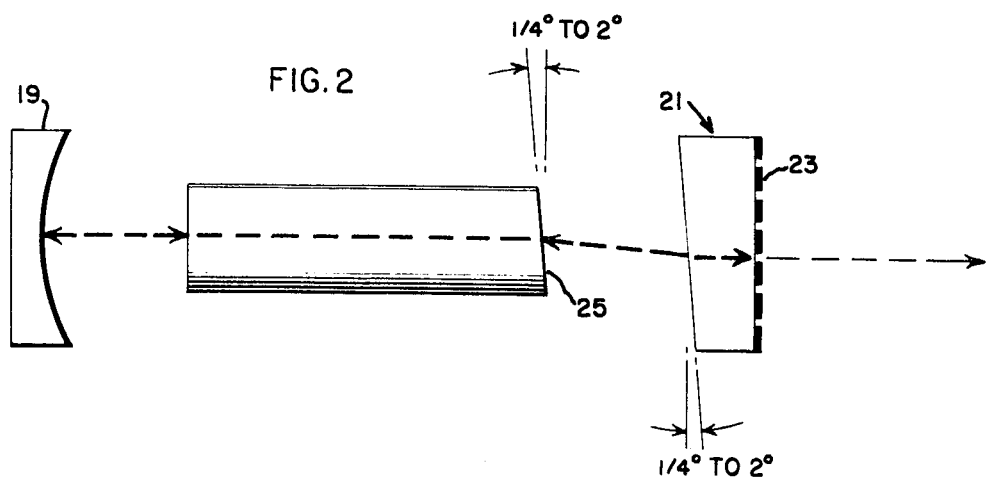
FIG. 2 illustrates a laser oscillator optical configuration in accordance with the invention.

In accordance with the invention, such secondary oscillation may be controlled or eliminated by reconfiguring the laser optics to be as shown in FIG. 2, to which reference is now made. In FIG. 2 the laser rod 17 again has associated therewith one totally reflecting etalon 19, shown in the form of a first surface spherical mirror of relatively large radius, typically of one-half meter to 10 meters radius, or if preferred this may be a plane mirror (infinite radius). The output etalon 21 is shown in the form of an optical wedge having a partially reflective surface at 23, this wedge preferably being a second surface element with its reflective surface 23 located to the outside of the Fabry-Perot cavity as shown. Such location has been found to enable higher power capability and also to simplify alignment of the optical system as hereinafter explained.

The output end surface 25 of the laser rod 17 is beveled or angled with respect to the perpendicular to the rod optical axis. This angle as shown in FIG. 2 is greatly exaggerated for purposes of illustration; the preferred angle of bevel or tilt is within the range of approximately one-fourth degree to 2° and so is barely if at all perceptible to the eye. The output wedge 21 preferably but not necessarily is given the same angle as that of the bevel of the laser rod end. With the rod bevel angle times its index of refraction equal to that of the wedge angle times its index of refraction the output beam will be parallel to the rod axis, though offset slightly as shown by the tangent of the beam tilt angle times the distance between the rod end and the output element.

In operation of the laser oscillator of FIG. 2, secondary oscillations between pairs of parallel optical surfaces are very substantially reduced by elimination of most of the secondary cavities which as explained above exist in laser oscillator systems of conventional design. This prevents excessive buildup of lasing action due to extra optical passes or transits at specific areas between parallel surfaces which define such secondary oscillator cavities. The energy per unit cross section area of the output laser beam then is substantially uniform and free of hot spots, thus enabling maximum energy per pulse without damage to rod, etalons or other associated optical elements.

Figure 3:
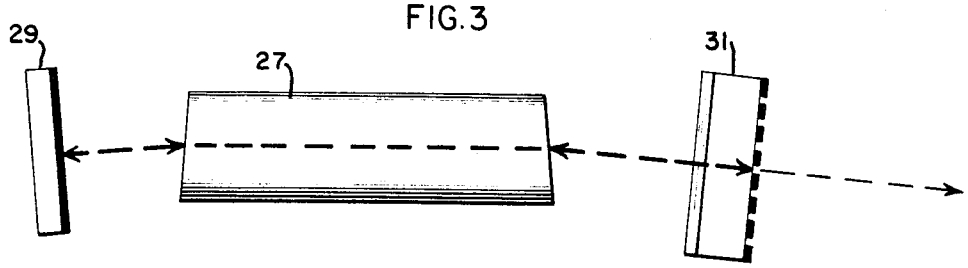
FIG. 3 illustrates an alternative embodiment of laser oscillator optical configuration in accordance with the invention.

For extreme cases of hot spots, as occur particularly with such low gain configurations as short rods with high reflectance output elements, both end surfaces of the laser rod may be beveled and the output element wedge rotated as much as 90° about the rod optical axis, as illustrated in FIG. 3. As there shown, both ends of the laser rod 27 are ground and polished at a small angle to the perpendicular to the rod axis, which angles may conveniently be the same at both ends of the rod though they need not necessarily be. Optical alignment is simplified if the rod end angles are so oriented that the rod appears trapezoidal as shown, but an even greater degree of protection against secondary oscillation may be achieved by rotating one of the two angled surfaces with respect to the other about the rod axis, to displace the surface thus rotated 90° with respect to the other surface.

The output wedge 31 is shown similarly rotated in FIG. 3, for the same purpose. Here the wedge has been rotated 90° about the rod axis, to place its front or entrance surface at an angle skewed with respect to that of the adjacent exit surface of laser rod 27, thus further insuring against any possibility of secondary oscillation occurring between these elements.

Where both ends of the rod are beveled as in FIG. 3, the totally reflective etalon 29 also should be aligned with a slight tilt as shown, so as to be oriented with its reflective surface normal to the laser beam incident upon it. If a roof prism is used as the reflective element, the front surface should be adjusted off axis so as to avoid having two plane parallel surfaces which would support secondary oscillation, and the prism optical axis must of course be aligned to the rod axis so as to support the primary lasing action.

As previously indicated, the preferred angle of bevel of the laser rod end surfaces is in the range of one-fourth degree to 2°, and for the most commonly used laser optical configurations one-half degree has been found suitable and particularly convenient because of the wide commercial availability of one-half degree optical wedges as standard items. The optimum value for this angle is dependent on design of the optical system and particularly on the length-diameter ratio of the laser rod element; where the rod is relatively short yet large in diameter an angle larger than 2° and possibly as large as 5° may be desirable. In general the angle should be kept as small as possible consistent with avoidance of secondary oscillation, however, and the preferred range of one-fourth degree to 2° has been found generally adequate to satisfy this purpose.

From the foregoing it will be apparent that the relatively simple and inexpensive changes in laser oscillator optical configuration in any of the several alternative ways described provide substantial improvement in uniformity of laser beam intensity and in power capability without compromise of service life. While in this description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and described to be secured by Letters Patent of the United States is:

1. A laser oscillator comprising an active laser element in the form of an elongated rod having a longitudinal axis, first and second etalons disposed along the longitudinal axis of said rod in spaced relation to the opposite ends thereof and having at least partially reflective surfaces aligned to sustain laser oscillation within the cavity thus defined, said laser rod having at least one of its opposite end surfaces disposed at a small angle of between one-fourth degree and 2° with respect to the perpendicular to said longitudinal axis to thereby reduce secondary oscillations between said surface and surfaces of said etalons and the other rod end.

2. A laser oscillator as defined in claim 1 wherein one of said etalons is totally reflective and the other is a partially reflective optical wedge, wherein the angled end of said laser rod is that adjacent said wedge, and wherein the angle of said wedge corresponds to that of the angled end of said rod.

3. A laser oscillator as defined in claim 1 wherein both end surfaces of said laser rod are angled with respect to the perpendicular to said longitudinal axis, and wherein one of the two angled end surfaces is rotated with respect to the other about the rod axis.

4. A laser oscillator as defined in claim 1 wherein said one end surface is disposed at an angle of approximately one-half degree to the perpendicular to the rod axis.

* * * * *